(12) United States Patent  
Shapley

(10) Patent No.: US 9,401,609 B2  
(45) Date of Patent: Jul. 26, 2016

(54) PORTABLE POWER TRANSFER DEVICE

(71) Applicant: Daniel J. Shapley, Milwaukie, OR (US)

(72) Inventor: Daniel J. Shapley, Milwaukie, OR (US)

( * ) Notice: Subject to any disclaimer, the term of this patent is extended or adjusted under 35 U.S.C. 154(b) by 143 days.

(21) Appl. No.: 14/220,311

(22) Filed: Mar. 20, 2014

(65) Prior Publication Data

US 2014/0285137 A1  Sep. 25, 2014

Related U.S. Application Data

(60) Provisional application No. 61/803,513, filed on Mar. 20, 2013.

(51) Int. Cl.
 *H02J 7/00* (2006.01)
(52) U.S. Cl.
 CPC ............. *H02J 7/0045* (2013.01); *H02J 7/0054* (2013.01); *H02J 2007/0062* (2013.01)
(58) Field of Classification Search
 CPC   H02J 7/0045; H02J 7/0054; H02J 2007/0062
 USPC ......................................................... 320/107
 See application file for complete search history.

(56) References Cited

U.S. PATENT DOCUMENTS

| | | | | |
|---|---|---|---|---|
| 2,331,131 | A * | 10/1943 | Moyer ..................... | H02J 7/125 307/151 |
| 5,375,051 | A * | 12/1994 | Decker .................. | G06F 1/3215 323/901 |
| 5,771,165 | A * | 6/1998 | Couture ................... | H02J 7/022 320/DIG. 28 |
| 5,793,184 | A * | 8/1998 | O'Connor ............... | H02J 7/355 136/251 |
| 7,761,198 | B2 * | 7/2010 | Bhardwaj ........... | F02N 11/0866 104/34 |
| 8,330,416 | B2 * | 12/2012 | Goma ................... | H01M 10/46 320/107 |
| 2012/0212067 | A1 * | 8/2012 | Lai .......................... | H02J 7/355 307/84 |

* cited by examiner

*Primary Examiner* — Sun Lin

(57) ABSTRACT

A portable power transfer device has input connectors and output connectors which can be used to transfer power from a first electronic device to a second electronic device. The connectors are housed in a main enclosure, which also has an auxiliary USB port. An internal power source is also housed in the main enclosure. The second electronic device can be charged through an output connector or a USB cable connected to the auxiliary USB port by draining power from the first electronic device or from the internal power source. A voltage regulation circuit is electrically connected between the input connectors and the output connectors, as well as between the auxiliary port and the input connectors. The voltage regulation circuit ensures a desirable output voltage. In addition to power transfer, the power transfer device enables data transfer when using USB connectors and ports to connect the first electronic device and the second electronic device.

20 Claims, 15 Drawing Sheets

PORTABLE POWER TRANSFER DEVICE

The current application claims a priority to the U.S. Provisional Patent application Ser. No. 61/803,513 filed on Mar. 20, 2013.

FIELD OF THE INVENTION

The present invention relates generally to mobile device accessories and peripheral equipment. More specifically, the present invention is a power transfer device with power transfer capabilities. The present invention enables a user to effectively transfer power from one mobile device to another in the absence of other power sources such as a wall socket charger. The present invention also possesses limited data transfer abilities.

BACKGROUND OF THE INVENTION

In the modern world, mobile devices such as cell phones, smart phones, and tablet computers have become incredibly commonplace. Mobile devices perform tasks such as wireless communication, data storage, and of course computations. Wireless communication is perhaps the most dominant and driving force behind mobile device innovation as nearly everyone in developed countries possesses at least a cell phone such that other people may contact them when they are away from their homes. Wireless communication devices are also extremely useful in emergency situations where people in distress may not have any way other than wireless communication to get in contact with emergency services such as the police. Additionally, many mobile devices such as smart phones can access other forms of communication such as social networking and emails, thus securing mobile devices a place in people's day to day lives.

In response to the prevalence of mobile devices in the market today, a myriad of supporting devices and other accessories such as chargers, wireless headsets, memory cards, speakers, cases, screen covers, and even remote controlled vehicles have been developed and marketed. These supporting devices and accessories are bought by the huge percentage of the population in possession of mobile devices which can make use of them. One of the most common fields of mobile device accessories is power. All mobile devices require power in order to operate. As a result of this fact, all mobile devices possess batteries which store electrical energy for later consumption by the mobile device. These batteries must be charged at regular intervals, and if they are allowed to empty completely, the mobile device ceases to function. In response to this fact, there is a wide range of different charging cables and auxiliary batteries. Auxiliary batteries available on the market may augment the amount of electrical energy that is stored. Alternatively, some auxiliary batteries are designed to quickly charge up the mobile device's native battery such that the mobile device can continue to operate for a short period of time.

It is an object of the present invention to introduce a device which combines the functionality of both power transfer and limited data transfer, thus creating one device which can both recharge electronic devices and act as a communications hub. In addition, the present invention possesses features which allow it to take advantage of a process that no other device has capitalized on to date: the simple fact that while the power source of one mobile device is expended, the power source of a second mobile device may be fully or partially charged. That second device can act as a power source for the first.

It is an object of the present invention to allow for the transfer of power from a fully or partially charged mobile device to another mobile device whose power source is expended. In this endeavor, it is a further object of the present invention to allow for different models of phone to transfer power from one to another. For example, a phone from the well known manufacturer Apple may transfer power to a phone of the rival company Samsung using the present invention, as the present invention possesses the necessary connection interfaces to link the two mobile devices together.

DETAIL DESCRIPTIONS OF THE INVENTION

Figure 1:
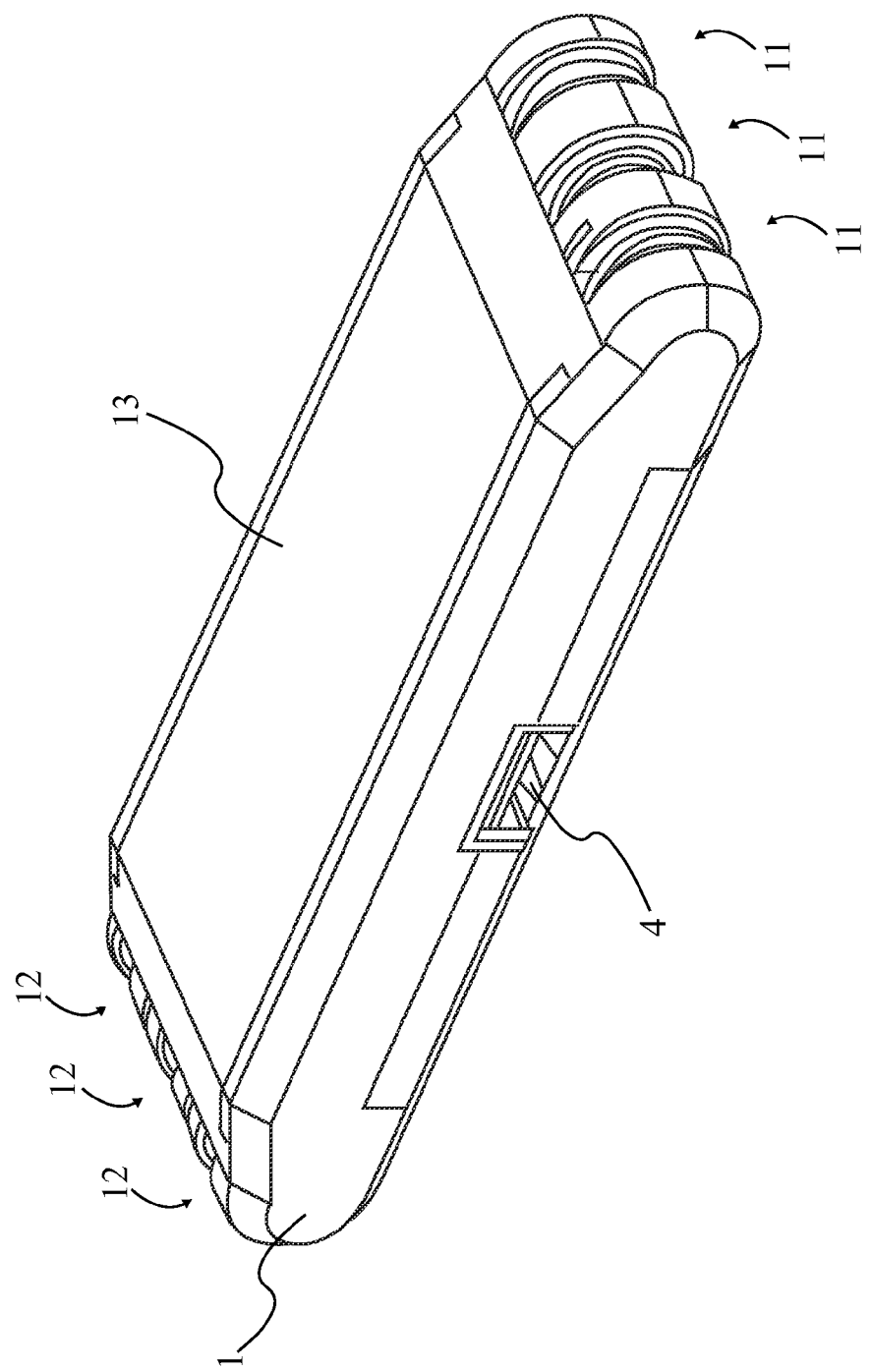
FIG. 1 is a perspective view of a main enclosure of the present invention.
Figure 2:
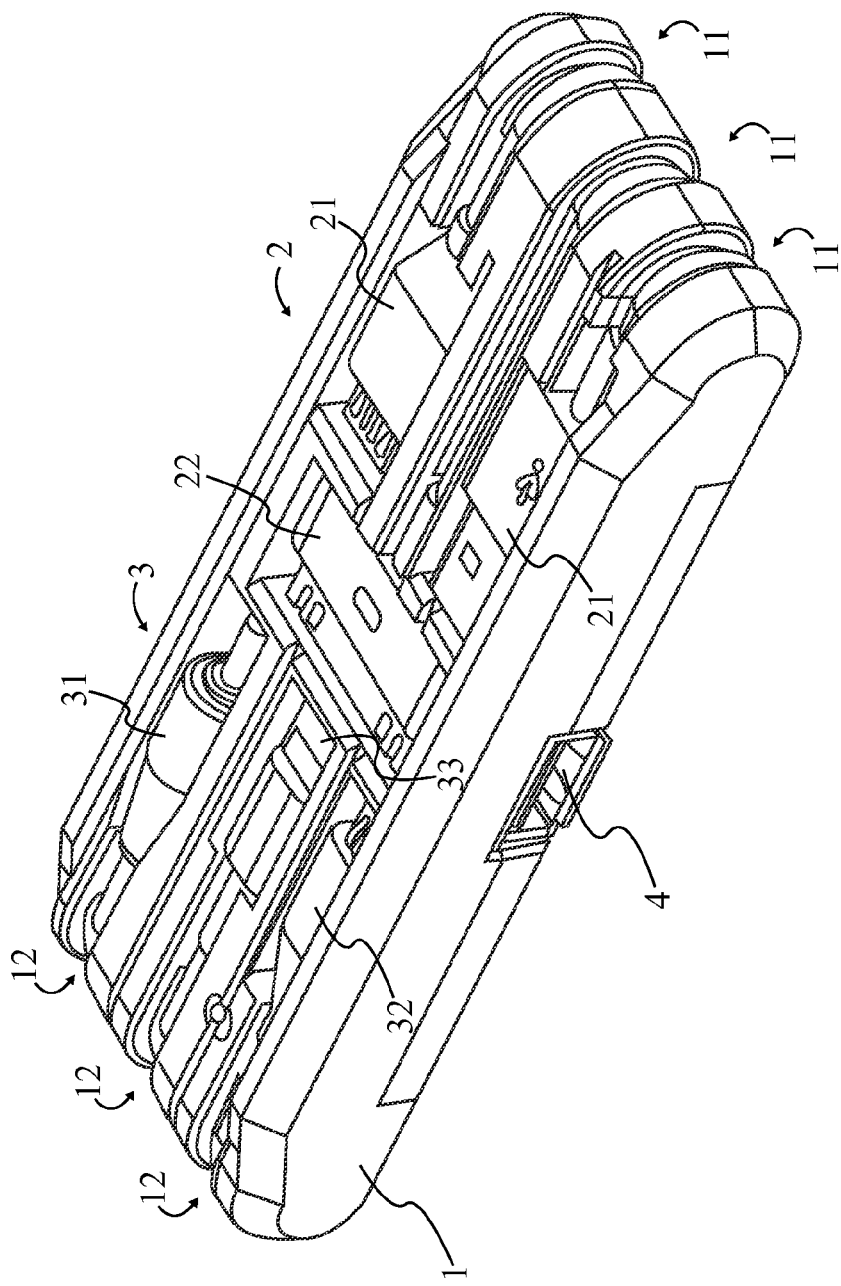
FIG. 2 is a perspective view of the main enclosure of the present invention, with cover omitted for ease of disclosure.
Figure 3:
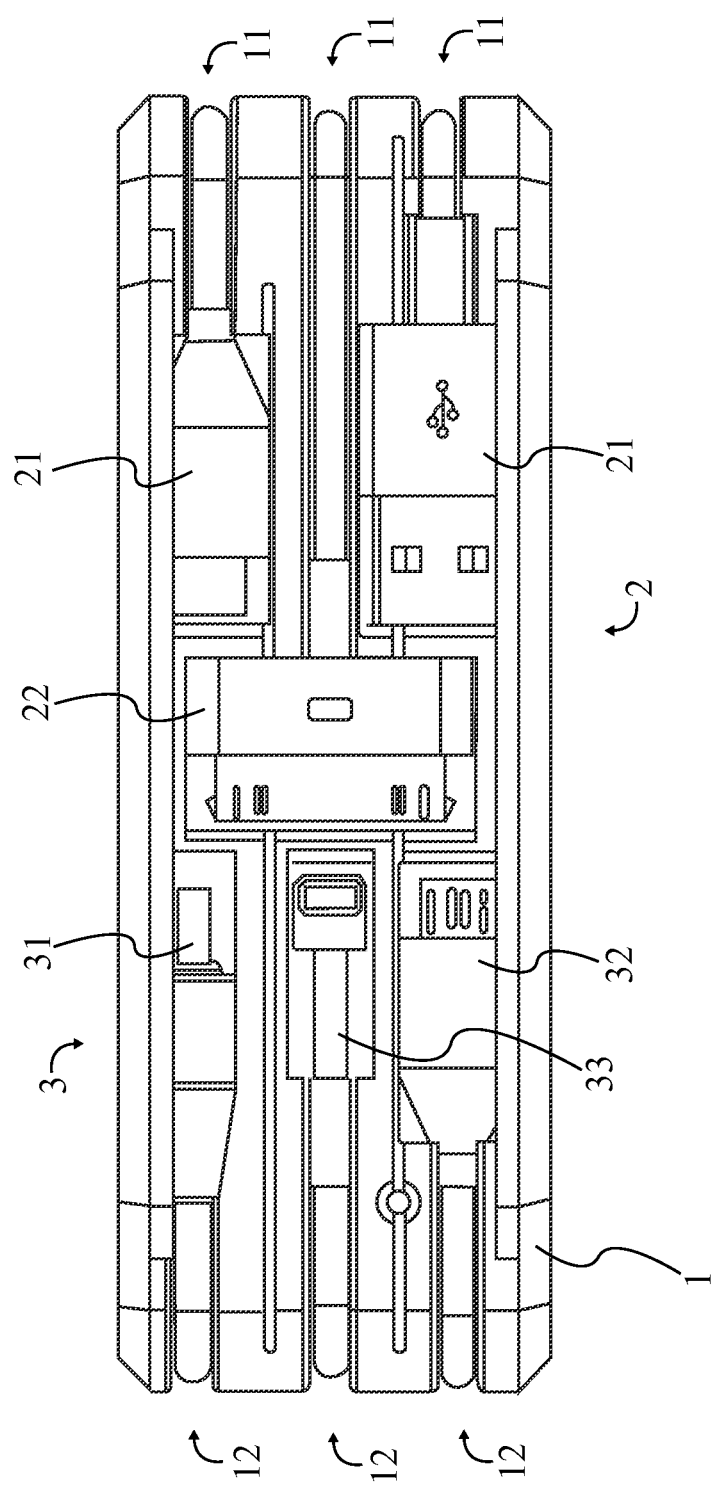
FIG. 3 is a top view of the main enclosure of the present invention, with cover omitted for ease of disclosure.
Figure 4:
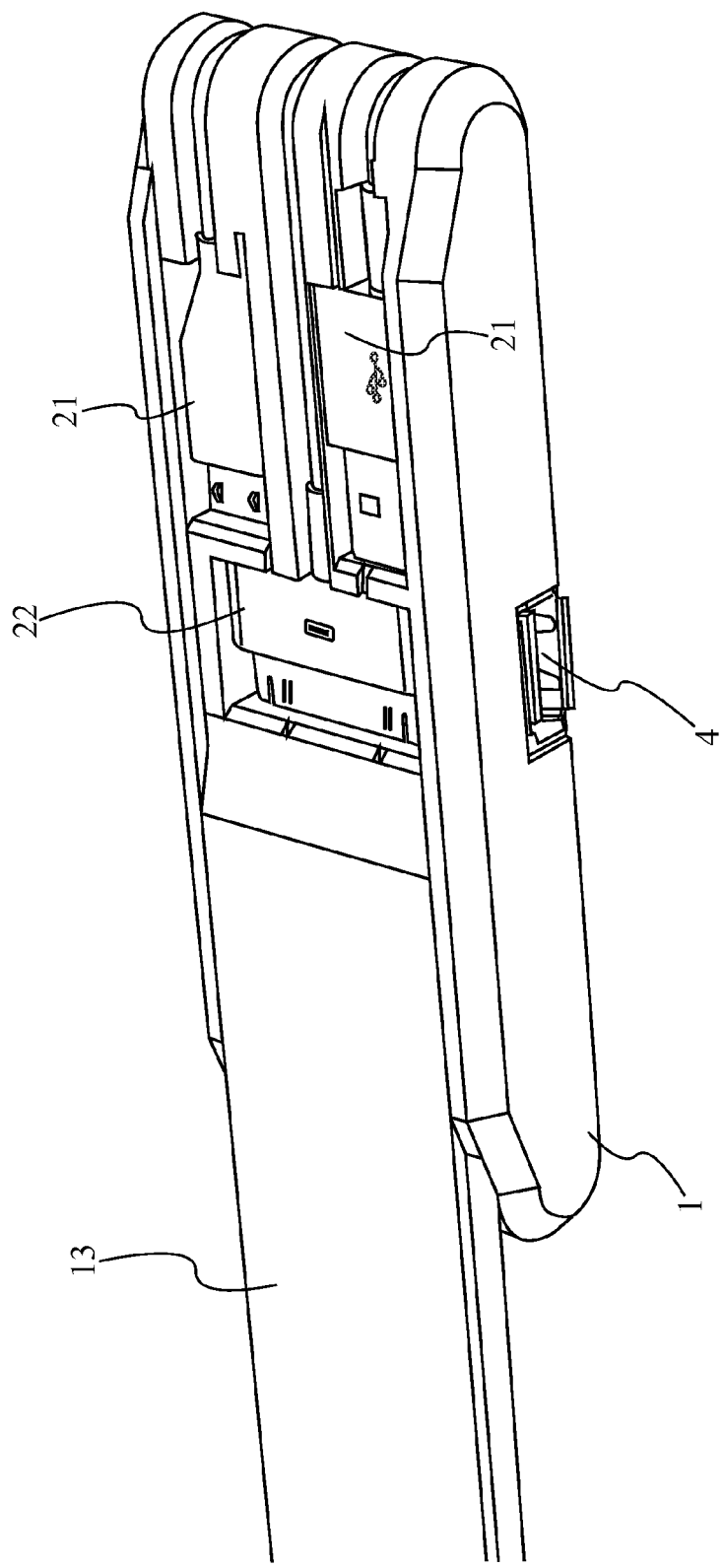
FIG. 4 is a perspective view of the main enclosure of the present invention with the cover moved to reveal input connectors.
Figure 5:
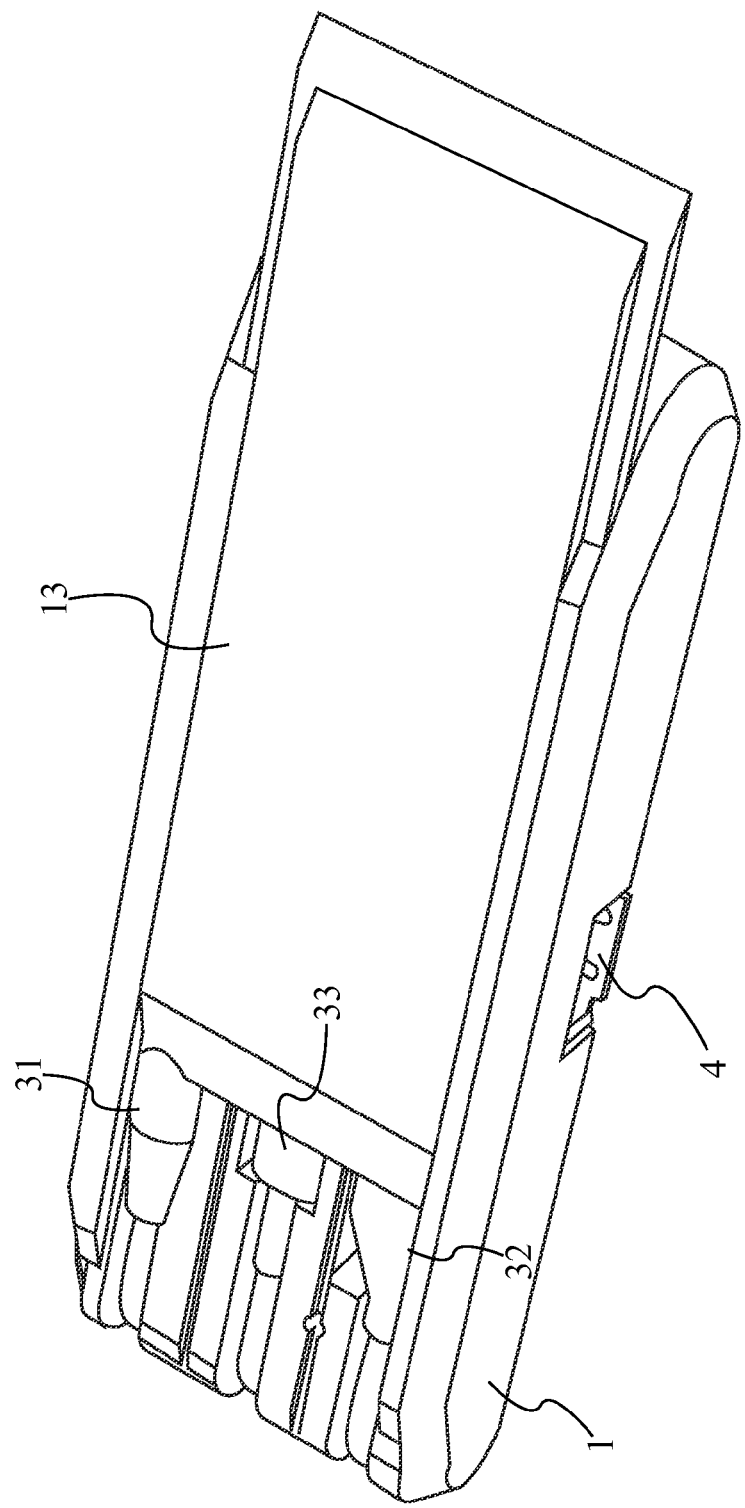
FIG. 5 is a perspective view of the main enclosure of the present invention with the cover moved to reveal output connectors.
Figure 6:
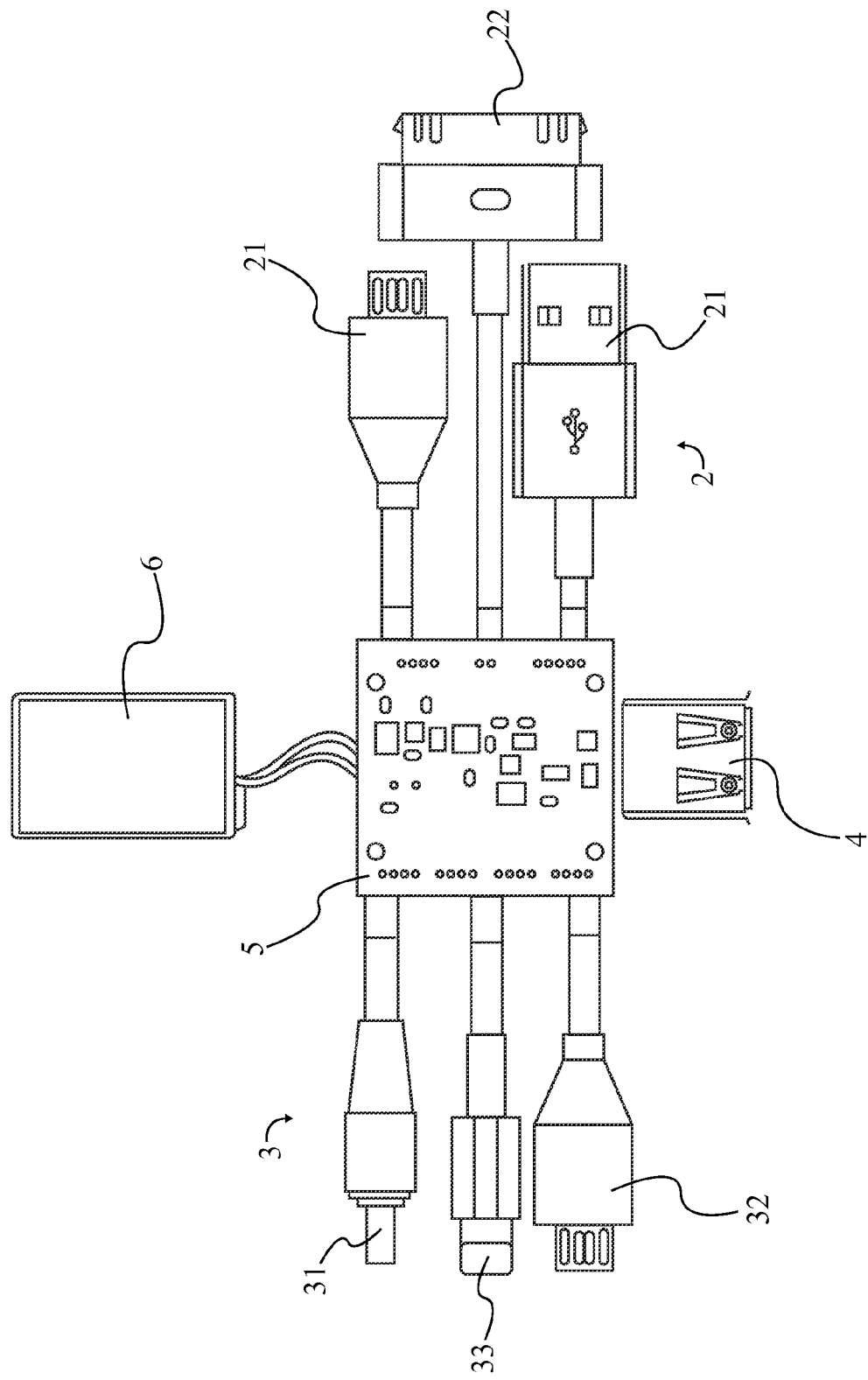
FIG. 6 is a top view of the electrical connections of the present invention, with main enclosure and cover omitted for ease of disclosure.
Figure 7:
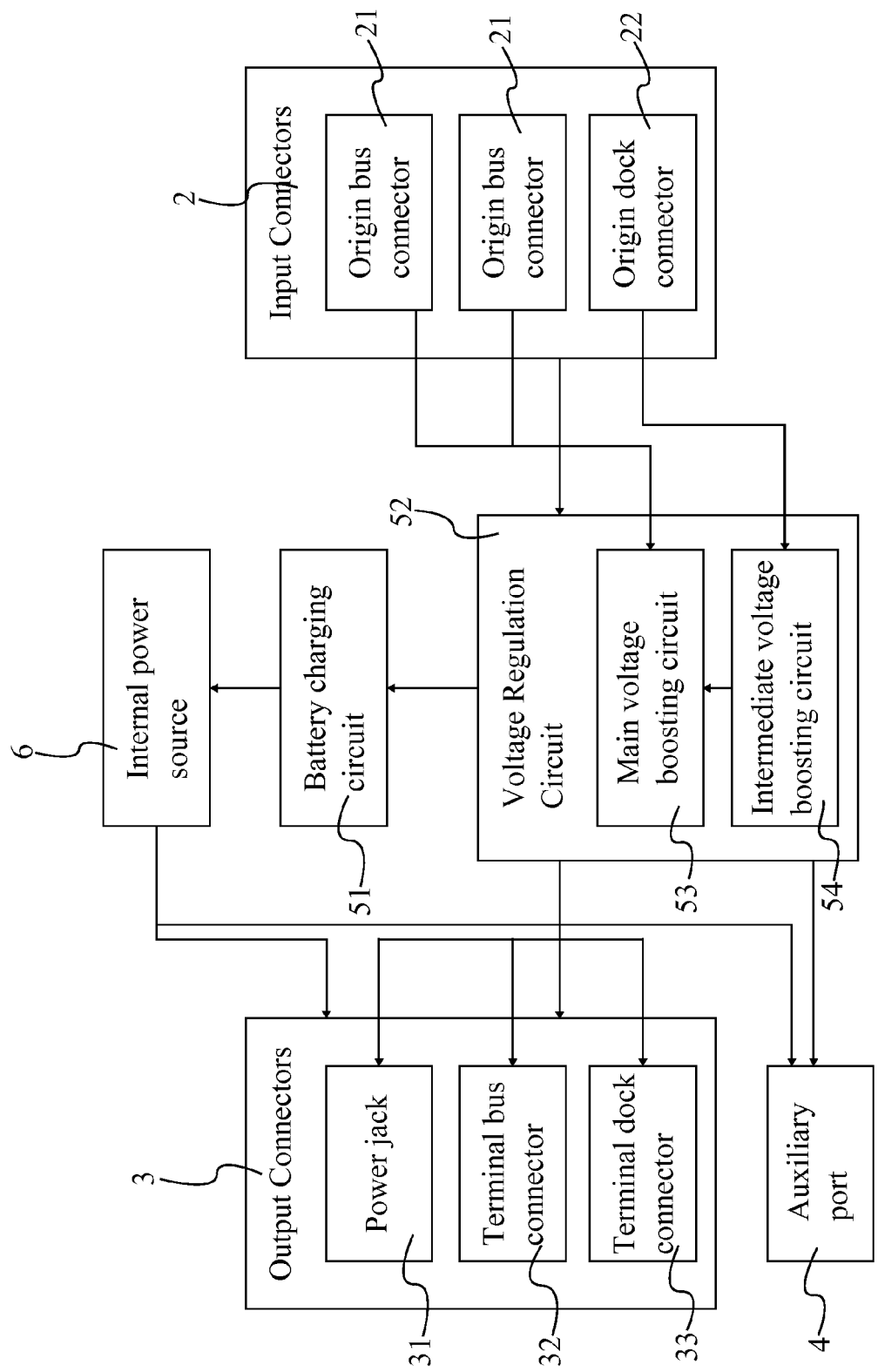
FIG. 7 is a diagram of the electrical connections of the present invention.

All illustrations of the drawings are for the purpose of describing selected versions of the present invention and are not intended to limit the scope of the present invention.

The present invention is a portable power transfer device that is able to charge an electronic device by draining power from another electronic device. The present invention is also able to transfer data between two devices through the provision of specific connections. These abilities are integrated into a small device which can easily be carried on one's person or packed in small bags, resulting in improved portability. Supporting these functions, the present invention comprises a main enclosure 1, a plurality of input connectors 2, a plurality of output connectors 3, an auxiliary port 4, a power transfer system 5, and an internal power source 6. The plurality of input connectors 2 allow power to be transferred from a first electronic device to a second electronic device by means of the power transfer system 5. The plurality of input connectors 2 also allows the internal power source 6 to be recharged, with the internal power source 6 providing an auxiliary power source if there is not a second electronic device available. The present invention is illustrated in FIG. 1-FIG. 7.

Describing the power transfer aspect in more detail, the power transfer system 5 comprises a battery charging circuit 51 and a voltage regulation circuit 52. The battery charging circuit 51 allows the internal power source 6 to be recharged through the plurality of input connectors 2, as previously described. The voltage regulation circuit 52 regulates power provided through the plurality of input connectors 2, ensuring that output voltages are at an optimal and safe level for the second electronic device connected via one of the plurality of output connectors 3 or the auxiliary port 4. The plurality of input connectors 2 are selectively housed in the main enclosure 1, minimizing wear and tear when not in use. The plurality of output connectors 3 are likewise selectively housed in the main enclosure 1 for the same reason. Enabling the power transfer from a first electronic device to a second electronic device, the plurality of input connectors 2 are electrically connected to the plurality of output connectors 3 through the voltage regulation circuit 52, as earlier referenced. Likewise, the formerly stated relation between the plurality of input connectors 2 and the battery charging circuit 51 is more concisely defined as the plurality of input connectors 2 being electrically connected to the internal power source 6 through the battery charging circuit 51.

Through the general connections described in the preceding paragraph, a first electronic device is able to charge both a second electronic device and the internal power source 6, provided the first electronic device has a sufficient amount of charge. By means of the electrical connections, power is drained from the first electronic device and supplied to the internal power source 6 (via the battery charging circuit 51) and the second electronic device (via the voltage regulation circuit 52). Thus, even without access to the electrical grid, as long as a user has two electronic devices they can use devices with high amounts of charge to recharge devices in which the battery is almost depleted.

The internal power source 6, provided as an auxiliary charging means for the plurality of output connectors 3, can itself be charged from the plurality of input connectors 2 through the battery charging circuit 51.

The auxiliary port 4 itself is positioned into the main enclosure 1 where it can receive a connector from an external device (e.g. a USB cable attached to a mobile phone or other device). The auxiliary port 4 is provided so that the present invention can be used to charge devices that do not have ports matching any of the plurality of output connectors 3. The auxiliary port 4 is electrically connected to the plurality of input connectors 2 through the voltage regulation circuit 52. The auxiliary port 4 is also electrically connected to the internal power source 6. Thanks to these connections, the auxiliary port 4 can charge an electronic device by drawing power from one of the plurality of input connectors 2 or directly from the internal power source 6. In the preferred embodiment of the present invention the auxiliary port 4 is implemented as a female universal serial bus (USB) port adhering to the on-the-go (OTG) specification.

The internal power source 6 can be electrically connected to the plurality of output connectors 3 and the auxiliary port 4 through the voltage regulation circuit 52, although in a preferred embodiment the provided internal power source 6 already outputs voltage at an optimal level and does not need to utilize a voltage step-up (boost). If necessary, the internal power source 6 can be electrically connected to the voltage regulation circuit 52 in order to provide a constant desired output voltage.

The invention as thus described provides a portable means of recharging electronic devices when unable to access an electrical grid. The ability to utilize an available electric grid, by means of the plurality of input connectors 2 (specifically the male USB plug), is also provided. To better describe how the invention houses the plurality of input connectors 2 and the plurality of output connectors 3, and to identify preferable types of input connectors 2 and output connectors 3, additional components and relations are now introduced.

The main enclosure 1, which protects and houses the other components of the present invention, comprises a plurality of input receptacles 11, a plurality of output receptacles 12, and a cover 13. The plurality of input receptacles 11 and the plurality of output receptacles 12 are intended to house and secure the plurality of input connectors 2 and the plurality of output connectors 3, respectively. The plurality of input receptacles 11 and the plurality of output receptacles 12 are each positioned into the main enclosure 1; in the preferred embodiment they create cavities shaped to fit the plurality of input connectors 2 or the plurality of output connectors 3. Thus, the plurality of input connectors 2 are housed in the plurality of input receptacles 11 while the plurality of output connectors 3 are housed in the plurality of output receptacles 12. This positioning can be seen in FIG. 2 and FIG. 3. The exact material composition and shape of the body can vary in alternative embodiments and ultimately may composed of any material such as plastic, silicone rubber, and even metal.

In the preferred embodiment the plurality of input connectors 2 and the plurality of output connectors 3 are positioned opposite each other along the main enclosure 1; this configuration provides plenty of space for individual input connectors 2 and individual output connectors 3. The cover 13, which further protects the connectors from wear and tear, is adjacently attached to the main enclosure 1, by means of a rail engagement in the preferred embodiment and as seen in FIG. 1 and shown in different positions in FIG. 4 and FIG. 5. As the cover 13 is provided for the protection of the connectors, the configuration of the present invention encloses both the plurality of input connectors 2 and the plurality of output connectors 3 between the main enclosure 1 and the cover 13. While the preferred embodiment describes a rail-based cover 13, in other embodiments the cover 13 could be configured in a number of different ways. One example embodiment, not intended to limit the cover 13 in other embodiments, has the cover 13 being hingedly connected to the main enclosure 1 such that it can be rotated between an open and shut position. The plurality of input connectors 2 and the plurality of output connectors 3 each preferably have a flexible portion and a plug portion. The flexible portion, embodied as a cable, maintains the necessary electrical connections while allowing the plug portion to be maneuvered to facilitate ease of use. The plug portion itself, adjacently connected to the cable, is the part that interfaces with a corresponding port of a mobile device. The flexible portion and plug portion of the connectors can be seen in FIG. 2-FIG. 6.

While the present invention has thus far been described with the plurality of input connectors 2 and the plurality of output connectors 3, in the preferred embodiment the plurality of input connectors 2 comprises an at least one origin bus connector 21 and an at least one origin dock connector 22. This variety of connectors allows the present invention to be used with the majority of electronic devices. For example, USB ports, which are found on a wide range of devices, are one type of possible origin bus connector 21. USB connectors can further be divided into a number of subtypes, including both a micro USB and a USB type A which are implemented as the at least one origin bus connectors 21 in the preferred embodiment. Proprietary examples of dock connectors, such as Lightning and 30-pin dock connectors (both produced by the Apple corporation) are also extremely common in current electronic devices. In the preferred embodiment a 30-pin connector is used as the origin dock connector 22. These connectors, the at least one origin bus connector 21 and the at least one origin dock connector 22, are each electrically connected to the plurality of output connectors 3 through the voltage regulation circuit 52, ensuring that optimal and safe voltage levels are supplied to a connected second electronic device.

In the preferred embodiment, where a proprietary 30-pin origin dock connector 22 is utilized, the voltage regulation circuit 52 comprises a main voltage boosting circuit 53 and an intermediate voltage boosting circuit 54, each of which uses a step-up DC-DC converter to increase voltage to a desired level. The intermediate voltage boosting circuit 54 is provided for the proprietary origin dock connector 22, which needs multiple step-up stages to achieve the desired voltage. Resultantly, the at least one origin bus connector 21 is electrically connected to the main voltage boosting circuit 53 (as it only requires single stage voltage step-up) while the at least one origin dock connector 22 is electrically connected to the main voltage boosting circuit 53 through the intermediate voltage boosting circuit 54 (i.e. a two stage voltage step-up).

The plurality of output connectors 3, meanwhile, comprises a power jack 31, an at least one terminal bus connector 32, and an at least one terminal dock connector 33. In the preferred embodiment a Lightning connector is used as the terminal dock connector 33. This variety of output connectors 3 is provided for similar reasons as the variety of input connectors 2, i.e. to allow the present invention to be used to recharge a majority of electronic devices. The specific output connectors 3 support this as they can interface with commonly used ports; in addition to bus-type and dock-type connectors, the power jack 31 can be used to interface with and charge electronic devices with a compatible port. In the preferred embodiment, the power jack 31 is a coaxial power plug as visible in FIG. 2, FIG. 3, FIG. 5, and FIG. 6.

The plurality of input connectors 2 supply power through electrical connections via the voltage regulation circuit 52 to the individual outputs. Thus, the plurality of input connectors 2 are electrically connected to the power jack 31 through the voltage regulation circuit 52, electrically connected to the at least one terminal bus connector 32 through the voltage regulation circuit 52, and electrically connected to the at least one terminal dock connector 33 through the voltage regulation circuit 52. As has been repeated, by completing these electrical connections through the voltage regulation circuit 52 the present invention ensures an ideal output voltage.

While a preferred embodiment of the present invention has three specific input connectors 2 (micro USB, USB, and 30-pin) and three specific output connectors 3 (power jack 31, micro USB, and Lightning), in other embodiments the exact types and amounts of connectors can be varied while still providing a means for power transfer. For example, a potential basic embodiment may only comprise a single input connector and a single output connector. Another alternative embodiment may instead provide additional types of connectors, not limiting itself to bus-type, dock-type, or coaxial-type (as represented by the power jack 31).

In the preferred embodiment of the present invention, data transfer is an additional benefit, enabled when both the first electronic device and second electronic device are interfaced with a USB (whether micro or type A) connector. Supporting this, the plurality of input connectors 2 are electronically connected to the plurality of output connectors 3. This allows data to be transferred between two electronic devices with the appropriate ports and enables the present invention to essentially double as a data cable for connecting to (as an example) iTunes or a similar multimedia program.

Additionally, in the preferred embodiment, USB on-the-go (OTG) technology is implemented with the auxiliary port 4. As a result, the auxiliary port 4 is electronically connected to the plurality of output connectors 3 in order to allow it to connect mobile devices (e.g. phones or tablets) to storage devices (e.g. flash drives). Potentially, other devices such as game controllers and printers can be connected through the auxiliary port 4. While the preferred embodiment uses USB connectors as the preferred bus-type connector, any bus-connector is suitable for data transfer in addition to power transfer as they enable communications as well as power supply between connected devices.

Additional capabilities may be provided in enhanced embodiments of the present invention. For example, in one embodiment a storage medium can be housed within the main enclosure 1. This storage medium utilizes non-volatile storage (e.g. mechanical platter-based hard drives or NAND-based flash memory). A prong connector could be added in another environment, allowing the present invention to substitute as a power strip for electronic devices in the presence of grid-based electricity (e.g. 120 volt wall sockets in the United States). The prong connector could be hingedly connected to the main enclosure 1 and housed within the main enclosure 1; when not in use it is rotated into a receiving cavity of the main enclosure 1, reducing bulk of the present invention. These are just a few examples of possible alternative embodiments and are not intended to limit the alternative embodiments that can be adapted from the preferred embodiment.

Figure 8:
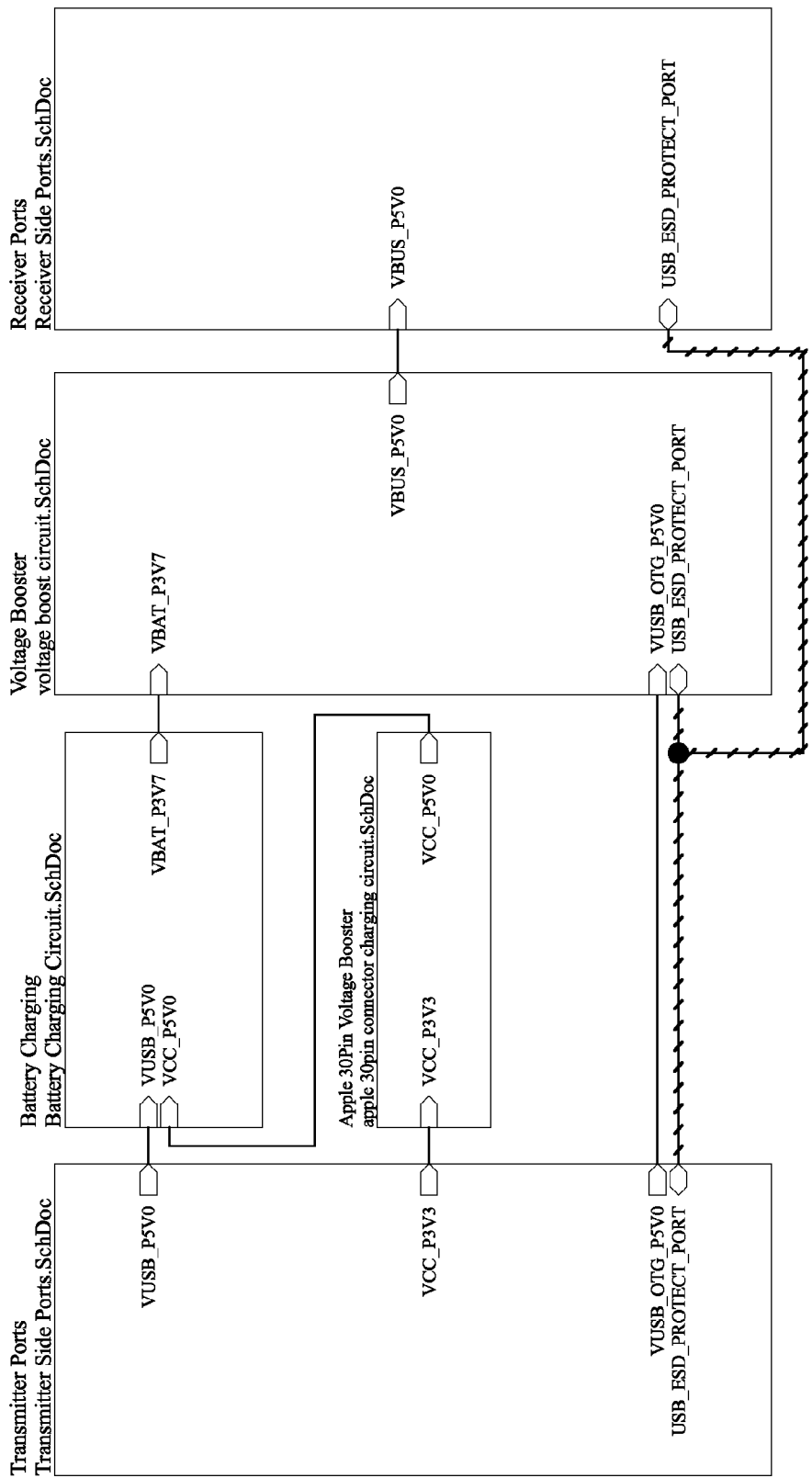
FIG. 8 is an example diagram of the electrical connections of the present invention.

A general circuit representation is provided in FIG. 8, showing a plurality of transmitter ports providing a first voltage supply, a second voltage supply, and a third voltage supply. These voltage supplies pass voltage through boosting circuits and battery charging circuits before being output at receiver ports. The first voltage supply is electrically connected to the receiver ports through a battery charging circuit and a primary voltage boosting circuit. The second voltage supply is connected to the battery charging circuit through a 30-pin voltage boosting circuit. From the battery charging circuit, the second voltage supply is electrically connected to the receiving ports through the primary voltage boosting circuit. The third voltage supply is electrically connected to the receiving ports both directly and through the primary voltage boosting circuit. The electrical connections of each individual circuit are subsequently covered in greater detail.

Figure 9:
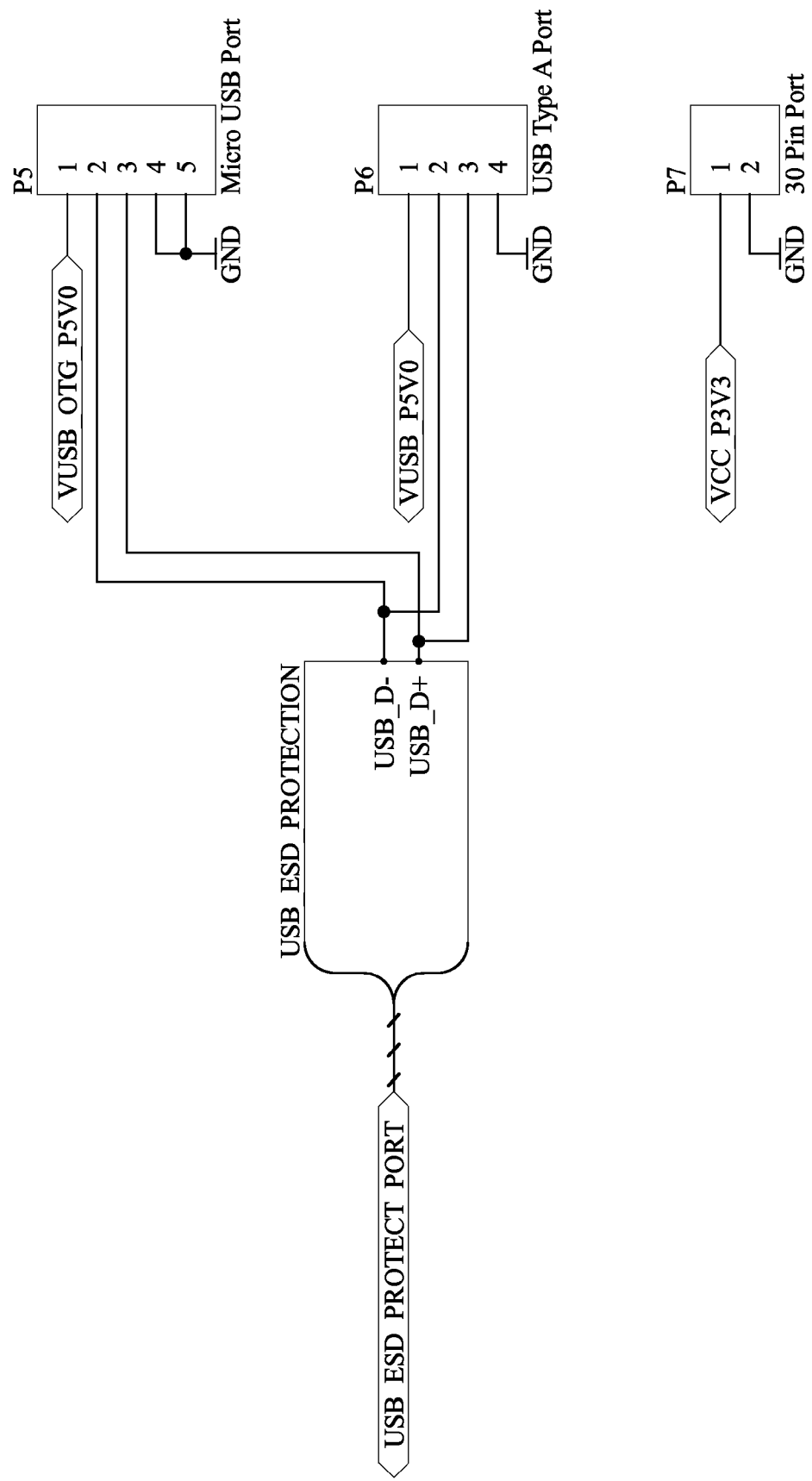
FIG. 9 is an example circuit diagram detailing a first set of connector ports of the present invention.

A electrostatic discharge protection component is shown in FIG. 9 with a negative terminal and a positive terminal. The negative terminal is electrically connected to a second pin of a micro USB port and a second pin of a USB type A port. The positive terminal is electrically connected to a third pin of the micro USB port and a third pin of the USB type A port. Describing the micro USB port in more detail, a voltage supply is electrically connected to a first pin while a fourth pin and a fifth pin are electrically connected to a ground. The USB type A port has a similar setup, in which a voltage supply is electrically connected to a first pin while a fourth pin is electrically connected to a ground. Finally, a 30 pin port is powered by a voltage supply which is electrically connected to a first pin, while a second pin is electrically connected to a ground. A separate port, a 30-pin port, is provided power by means of a voltage supply being electrically connected to a first pin, while a second pin is electrically connected to a ground.

Figure 10:
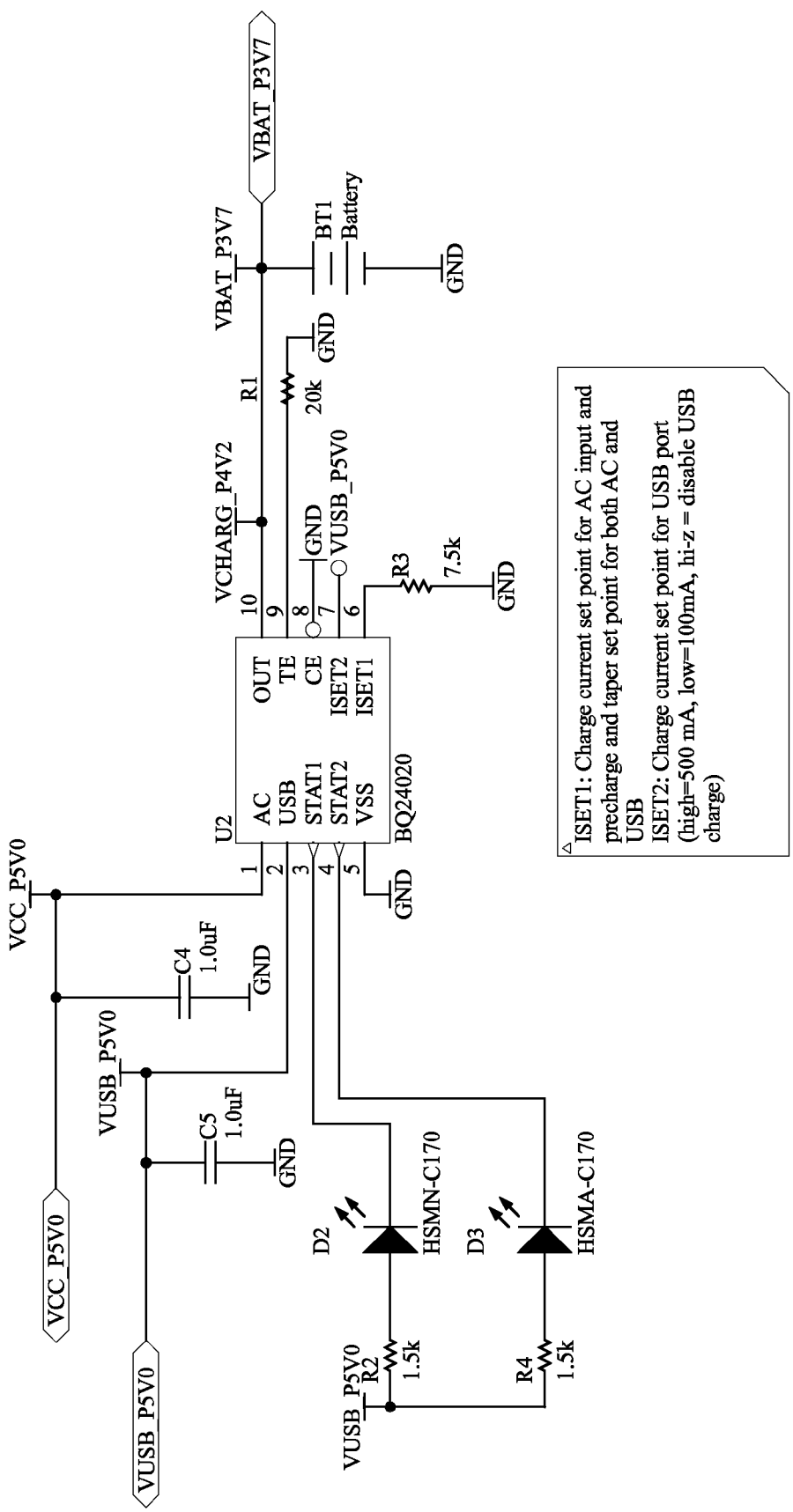
FIG. 10 is an example circuit diagram detailing a battery charging component of the present invention.

A battery-charging component is shown in FIG. 10, in which the battery-charging component has ten separate pins that enable electrical connections. A first voltage supply and a second voltage supply are electrically connected to a first pin and a second pin of the battery-charging component, respectively. The first voltage supply and the second voltage supply are additionally electrically connected to separate grounds through corresponding capacitors. A third pin is electrically connected to a fourth pin of the battery charging component through a lighting sub-circuit, the lighting circuit comprising a first LED, a first resistor, a second resistor, and a second LED. A fifth and sixth pin of the battery-charging component serve as ground connections, with the fifth pin being directly and electrically connected to a respective ground while the sixth pin is electrically connected to a respective ground through a resistor. A seventh pin is electrically connected to multiple ports as detailed in a later figure. An eight pin is electrically connected directly to a respective ground and a ninth pin is electrically connected to a respective ground through a resistor. A tenth pin is electrically connected to a ground through the battery (enabling the battery to be charged) as well as to a voltage boosting circuit as detailed in a later figure.

Figure 11:
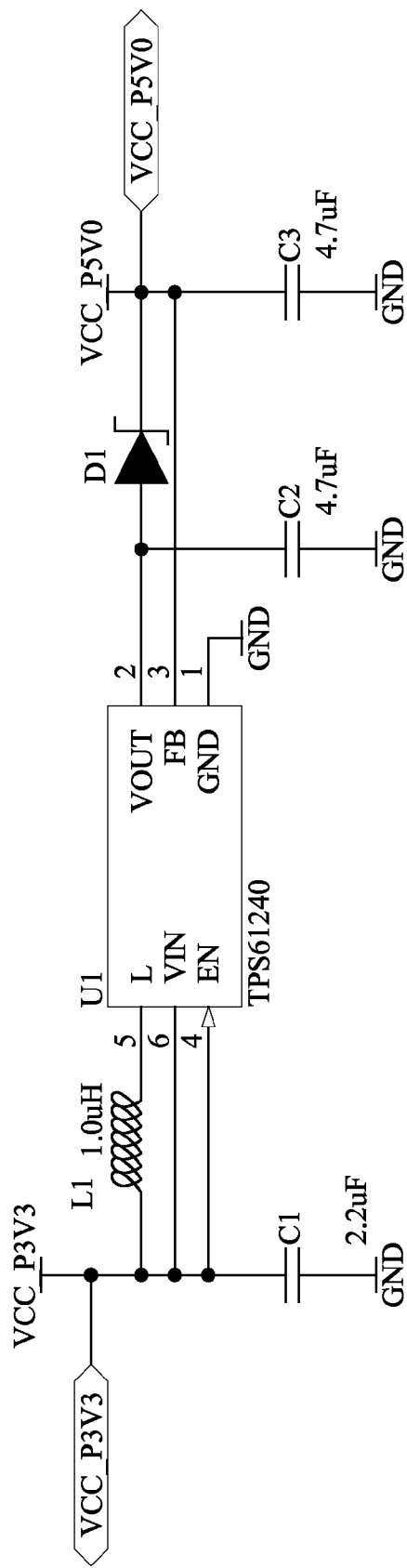
FIG. 11 is an example circuit diagram detailing a first voltage boosting circuit of the present invention.

A voltage boost circuit provided for a 30-pin connector is shown in FIG. 11, showing a step-up DC-DC converter component. The step-up DC-DC convert has six pins as subsequently detailed. A first pin is electrically connected to a respective ground, while a second pin is electrically connected to a first respective ground and a second respective ground through a first respective capacitor and a second respective capacitor. The second pin is additionally electrically connected to a second voltage boost circuit through a Schottky diode. The Schottky diode is also electrically connected in series between the second pin and the second respective ground and capacitor. A third pin is electrically connected to the second respective ground through the second respective capacitor, which are shared with the second pin. The third pin is also electrically connected to the second voltage boost circuit through the battery-charging component. A voltage supply is electrically connected to a fourth pin, a fifth pin, and a sixth pin, as well as electrically connected to a ground through a capacitor. The electrical connection between the voltage supply and the fifth pin is completed through an inductor.

Figure 12:
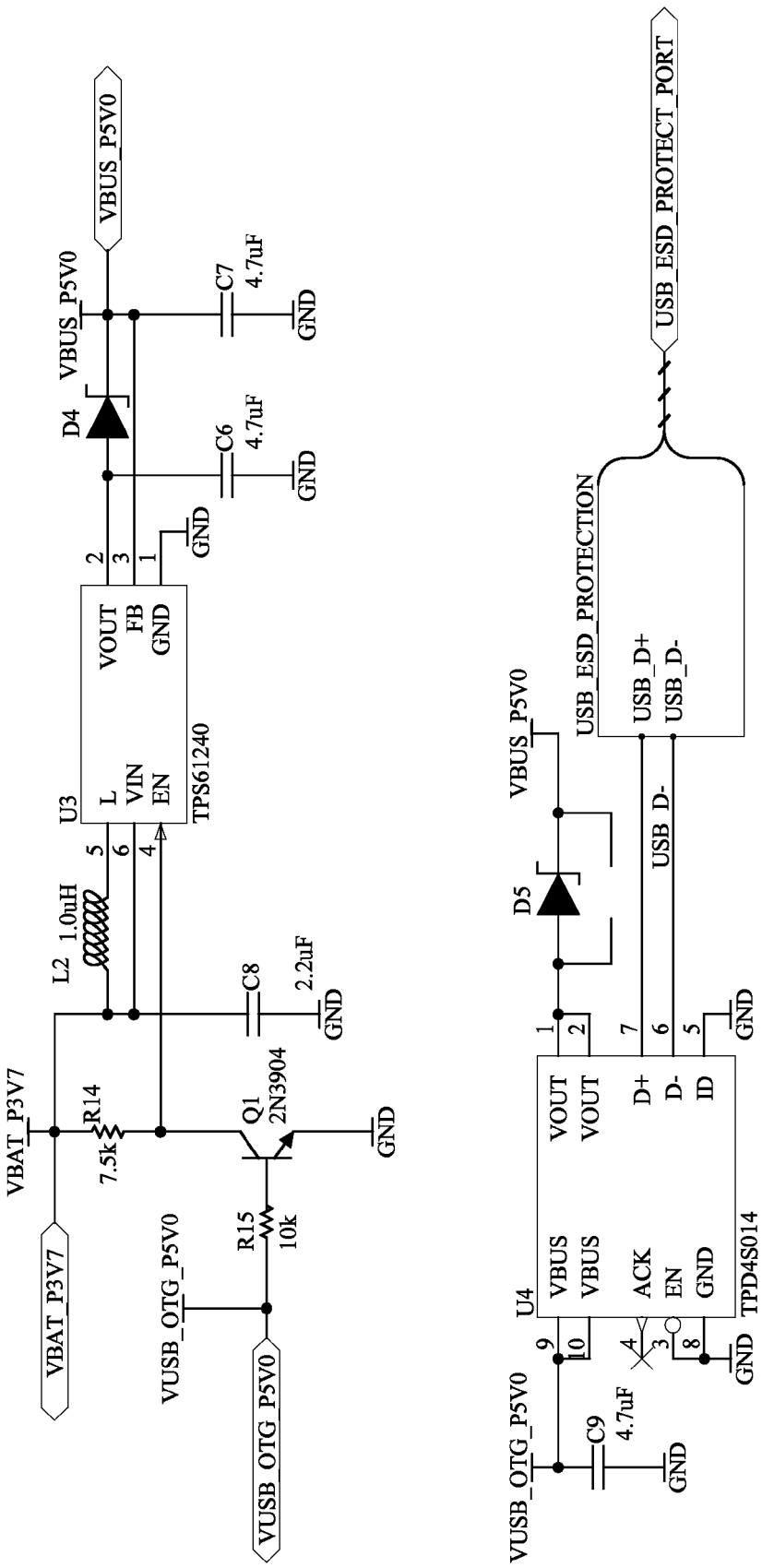
FIG. 12 is an example circuit diagram detailing a second voltage boosting circuit of the present invention.

A second voltage boost circuit shown in FIG. 12 is provided for direct boost of voltage received from USB connections and secondary boost of voltage received from the 30-pin voltage boost circuit via the battery-charging component. The second voltage boost circuit has a step-up DC-DC converter component with six pins and a USB protection component with ten pins. A first pin, second pin, and third pin of the step-up DC-DC converter have connections paralleling those of the step-up DC-DC converter used in the 30-pin voltage boost circuit. A first pin is electrically connected to a respective ground, while a second pin is electrically connected to a first respective ground and a second respective ground through a first respective capacitor and a second respective capacitor. The second pin is additionally electrically connected to a second voltage boost circuit through a Schottky diode. The Schottky diode is also electrically connected in series between the second pin and the second respective ground and capacitor. A third pin is electrically connected to the second respective ground through the second respective capacitor, which are shared with the second pin. The third pin is also electrically connected to multiple ports as detailed in a later figure. A first voltage supply and a second voltage supply are electrically connected to a fourth pin, a fifth pin, and a sixth pin, as subsequently described in more detail. The first voltage supply is electrically connected to the fourth pin through a first resistor, electrically connected to fifth pin through an inductor, and directly electrically connected to the sixth pin. The first voltage supply is also connected to a first ground through the first resistor and an amplifier, and connected to a second ground through a capacitor. The second voltage supply is electrically connected in series to the amplifier through a second resistor. From the amplifier, the second voltage supply is electrically connected to the fourth pin, as well as to the fifth pin through the first resistor and the inductor and to the sixth pin through the first resistor. From the amplifier, the second voltage supply is also directly electrically connected to the first ground and electrically connected to the second ground through the capacitor.

Regarding the USB protection component, a first pin and a second pin are electrically connected to multiple ports through a Schottky diode. A third pin and an eight pin are electrically connected to a first shared ground, with a fourth pin being left open. A fifth pin is electrically connected to a respective ground, while a sixth pin and seventh pin are connecting to corresponding negative and positive terminals of an electrostatic discharge protection component. Finally, a ninth pin and a tenth pin are electrically connected to a second shared ground through a capacitor.

Figure 13:
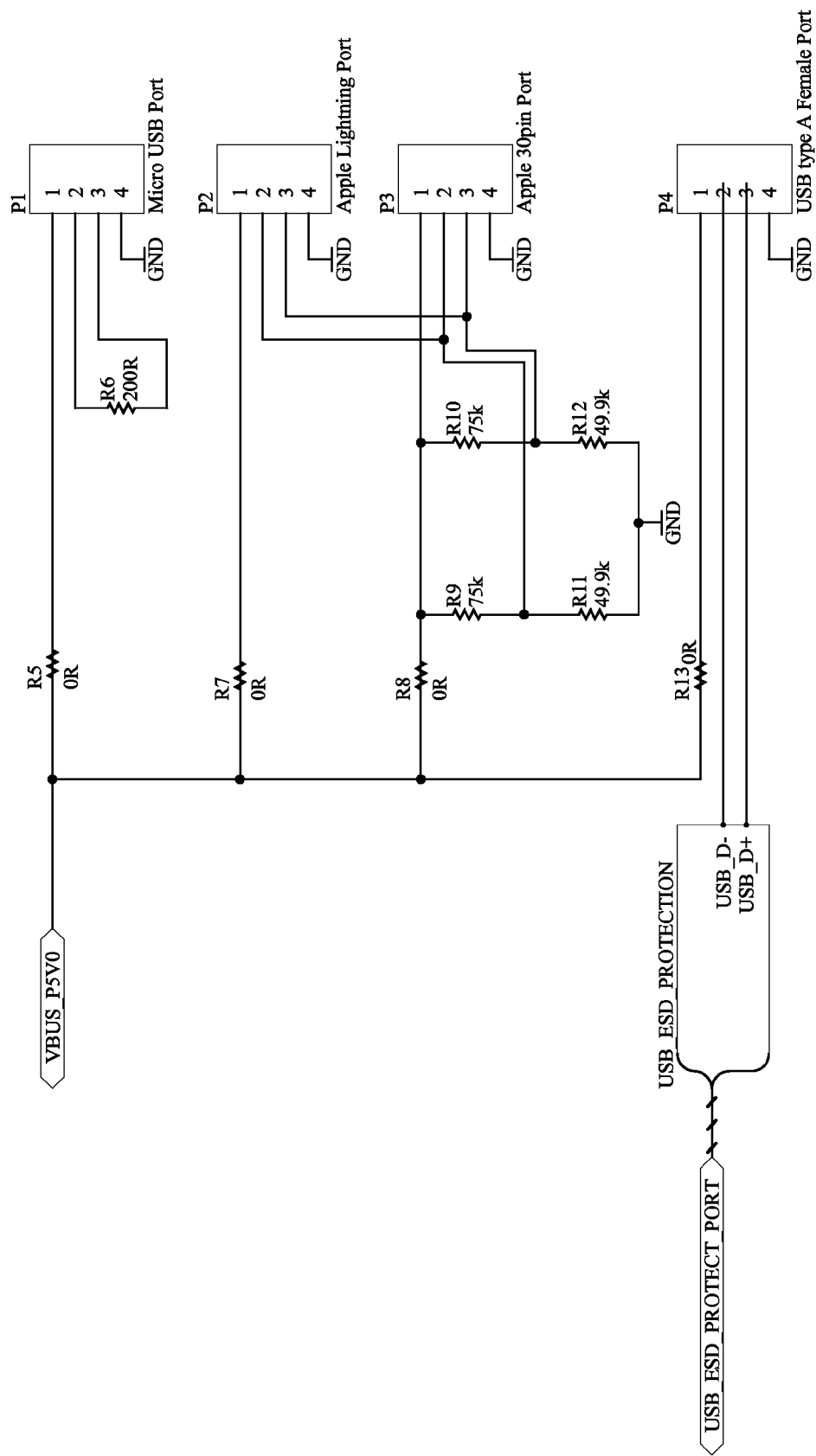
FIG. 13 is an example circuit diagram detailing a second set of connector ports of the present invention.

A circuit for providing connections to multiple ports, as previously referenced multiple times, is provided in FIG. 13. A voltage supply from the second voltage boost circuit is electrically connected to a first pin of a micro USB port through a first resistor, electrically connected to a first pin of an Apple Lightning port through a second resistor, electrically connected to a first pin of an Apple 30-pin port through a third resistor, and electrically connected to a USB type A female port through a fourth resistor. For the micro USB port, a second pin and a third pin are electrically connected to each other in series through a micro USB resistor, while a fourth pin is electrically connected to a ground. For the Apple Lightning port and the Apple 30-pin port, a respective second pin and third pin from each connector are electrically connected to a first pair of resistors, a ground, and a second pair of resistors in series. A fourth pin of each Apple port is also electrically connected to an individual ground. A second and third pin of the USB type A female port are electrically connected to a respective negative and positive terminal of a USB protection component. Finally, as with other ports, a fourth pin is electrically connected to a ground.

Figure 14:
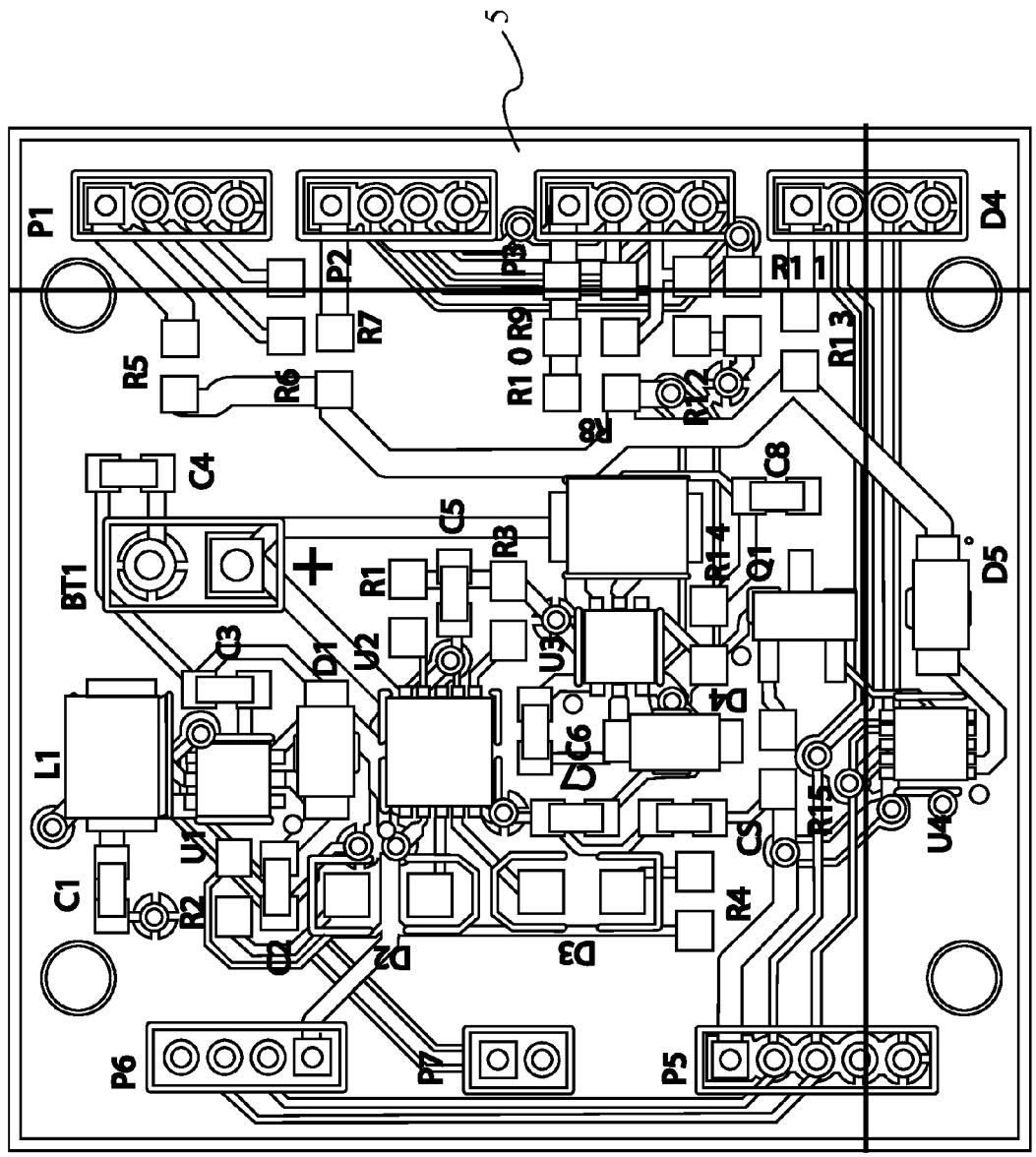
FIG. 14 is a top view of an example PCB of the present invention.
Figure 15:
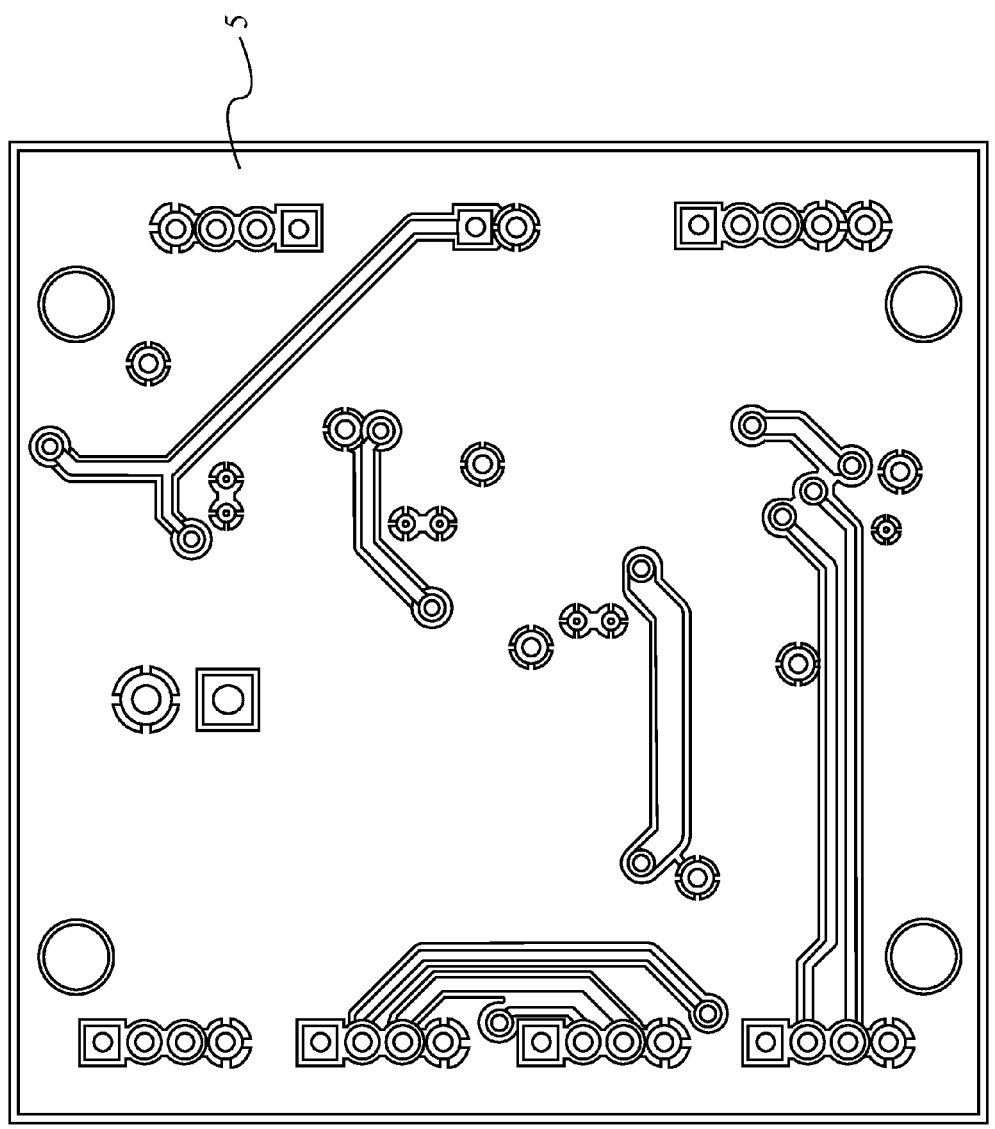
FIG. 15 is a bottom view of an example PCB of the present invention.

Example illustrations of a PCB on which the circuits of the present invention are integrated is provided in FIG. 14 and FIG. 15. In other embodiments different circuit implementations can be utilized while still providing the functionality provided by the present invention.

Although the invention has been explained in relation to its preferred embodiment, it is to be understood that many other possible modifications and variations can be made without departing from the spirit and scope of the invention as hereinafter claimed.

What is claimed is:

1. A portable power transfer device comprises:
a main enclosure;
a plurality of input connectors;
a plurality of output connectors;
an auxiliary port;
a power transfer system;
an internal power source;

the power transfer system comprises a battery charging circuit and a voltage regulation circuit;

the plurality of input connectors being selectively housed in the main enclosure;

the plurality of output connectors being selectively housed in the main enclosure;

the plurality of input connectors being electrically connected to the plurality of output connectors through the voltage regulation circuit;

the auxiliary port being positioned into the main enclosure;

the auxiliary port being electrically connected to the internal power source;

the auxiliary port being electrically connected to the plurality of input connectors through the voltage regulation circuit;

the plurality of input connectors being electrically connected to the internal power source through the battery charging circuit; and the internal power source being electrically connected to the plurality of output connectors through the voltage regulation circuit.

2. The portable power transfer device as claimed in claim 1 comprises:

the main enclosure comprises a plurality of input receptacles, a plurality of output receptacles, and a cover;

the plurality of input receptacles being positioned into the main enclosure;

the plurality of output receptacles being positioned into the main enclosure;

the plurality of input connectors being housed in the plurality of input receptacles; and the plurality of output connectors being housed in the plurality of output receptacles.

3. The portable power transfer device as claimed in claim 2 comprises:

the plurality of input connectors and the plurality of output connectors being positioned opposite each other along the main enclosure;

the cover being adjacently attached to the main enclosure;

the plurality of input connectors being enclosed between the main enclosure and the cover; and the plurality of output connectors being enclosed between the main enclosure and the cover.

4. The portable power transfer device as claimed in claim 1 comprises:

the plurality of input connectors comprises a power jack, at least one origin bus connector, and at least one origin dock connector; and the at least one origin bus connector and the at least one origin dock connector each being electrically connected to the plurality of output connectors through the voltage regulation circuit.

5. The portable power transfer device as claimed in claim 4 comprises:

the voltage regulation circuit comprises a main voltage boosting circuit and a intermediate voltage boosting circuit;

the at least one origin bus connector being electrically connected to the main voltage boosting circuit; and the at least one origin dock connector being electrically connected to the main voltage boosting circuit through the intermediate voltage boosting circuit.

6. The portable power transfer device as claimed in claim 4 comprises:

the at least one origin bus connector being electrically connected to the internal power source through the battery charging circuit; and the at least one origin dock connector being electrically connected to the internal power source through the battery charging circuit.

7. The portable power transfer device as claimed in claim 1 comprises:

the plurality of output connectors comprises a power jack, at least one terminal bus connector, and an at least one terminal dock connector; and the plurality of input connectors being electrically connected to the power jack, the at least one terminal bus connector, and the at least one terminal dock connector through the voltage regulation circuit.

8. The portable power transfer device as claimed in claim 1 comprises:

the plurality of input connectors being electronically connected to the plurality of output connectors, wherein data is transferred from one of the plurality of input connectors to one of the plurality of output connectors; and the auxiliary port being electronically connected the plurality of output connectors, wherein data is transferred from the auxiliary port to one of the plurality of output connectors.

9. A portable power transfer device comprises:

a main enclosure;

a plurality of input connectors;

a plurality of output connectors;

an auxiliary port;

a power transfer system;

an internal power source;

the main enclosure comprises a plurality of input receptacles, a plurality of output receptacles, and a cover;

the plurality of input connectors comprises a power jack, at least one origin bus connector, and at least one origin dock connector;

the plurality of output connectors comprises a power jack, at least one terminal bus connector, and at least one terminal dock connector;

the power transfer system comprises a battery charging circuit and a voltage regulation circuit;

the plurality of input connectors being selectively housed in the main enclosure;

the plurality of output connectors being selectively housed in the main enclosure;

the plurality of input connectors being electrically connected to the plurality of output connectors through the voltage regulation circuit;

the auxiliary port being positioned into the main enclosure;

the auxiliary port being electrically connected to the internal power source;

the auxiliary port being electrically connected to the plurality of input connectors through the voltage regulation circuit;

the plurality of input connectors being electrically connected to the internal power source through the battery charging circuit; and the internal power source being electrically connected to the plurality of output connectors through the voltage regulation circuit.

10. The portable power transfer device as claimed in claim 9 comprises:

the plurality of input receptacles being positioned into the main enclosure;

the plurality of output receptacles being positioned into the main enclosure;

the plurality of input connectors being housed in the plurality of input receptacles; and the plurality of output connectors being housed in the plurality of output receptacles.

11. The portable power transfer device as claimed in claim 9 comprises:
the plurality of input connectors and the plurality of output connectors being positioned opposite each other along the main enclosure;
the cover being adjacently attached to the main enclosure;
the plurality of input connectors being enclosed between the main enclosure and the cover; and
the plurality of output connectors being enclosed between the main enclosure and the cover.

12. The portable power transfer device as claimed in claim 9 comprises:
the at least one origin bus connector and the at least one origin dock connector each being electrically connected to the plurality of output connectors through the voltage regulation circuit.

13. The portable power transfer device as claimed in claim 9 comprises:
the voltage regulation circuit comprises a main voltage boosting circuit and a intermediate voltage boosting circuit;
the at least one origin bus connector being electrically connected to the main voltage boosting circuit; and
the at least one origin dock connector being electrically connected to the main voltage boosting circuit through the intermediate voltage boosting circuit.

14. The portable power transfer device as claimed in claim 9 comprises:
the at least one origin bus connector being electrically connected to the internal power source through the battery charging circuit; and
the at least one origin dock connector being electrically connected to the internal power source through the battery charging circuit.

15. The portable power transfer device as claimed in claim 9 comprises:
the plurality of input connectors being electrically connected to the power jack, the at least one terminal bus connector, and the at least one terminal dock connector through the voltage regulation circuit.

16. The portable power transfer device as claimed in claim 9 comprises:
the plurality of input connectors being electronically connected to the plurality of output connectors, wherein data is transferred from one of the plurality of input connectors to one of the plurality of output connectors; and
the auxiliary port being electronically connected the plurality of output connectors, wherein data is transferred from the auxiliary port to one of the plurality of output connectors.

17. A portable power transfer device comprises:
a main enclosure;
a plurality of input connectors;
a plurality of output connectors;
an auxiliary port;
a power transfer system;
an internal power source;
the main enclosure comprises a plurality of input receptacles, a plurality of output receptacles, and a cover;
the plurality of input connectors comprises a power jack, at least one origin bus connector, and at least one origin dock connector;
the plurality of output connectors comprises a power jack, at least one terminal bus connector, and at least one terminal dock connector;
the power transfer system comprises a battery charging circuit and a voltage regulation circuit;
the voltage regulation circuit comprises a main voltage boosting circuit and a intermediate voltage boosting circuit;
the plurality of input connectors being selectively housed in the main enclosure;
the plurality of output connectors being selectively housed in the main enclosure;
the plurality of input connectors being electrically connected to the plurality of output connectors through the voltage regulation circuit;
the auxiliary port being positioned into the main enclosure;
the auxiliary port being electrically connected to the internal power source;
the auxiliary port being electrically connected to the plurality of input connectors through the voltage regulation circuit;
the plurality of input connectors being electrically connected to the internal power source through the battery charging circuit;
the internal power source being electrically connected to the plurality of output connectors through the voltage regulation circuit;
the plurality of input connectors being electronically connected to the plurality of output connectors, wherein data is transferred from one of the plurality of input connectors to one of the plurality of output connectors; and
the auxiliary port being electronically connected the plurality of output connectors, wherein data is transferred from the auxiliary port to one of the plurality of output connectors.

18. The portable power transfer device as claimed in claim 17 comprises:
the plurality of input receptacles being positioned into the main enclosure;
the plurality of output receptacles being positioned into the main enclosure;
the plurality of input connectors being housed in the plurality of input receptacles;
the plurality of output connectors being housed in the plurality of output receptacles;
the plurality of input connectors and the plurality of output connectors being positioned opposite each other along the main enclosure;
the cover being adjacently attached to the main enclosure;
the plurality of input connectors being enclosed between the main enclosure and the cover; and
the plurality of output connectors being enclosed between the main enclosure and the cover.

19. The portable power transfer device as claimed in claim 17 comprises:
the at least one origin bus connector and the at least one origin dock connector each being electrically connected to the plurality of output connectors through the voltage regulation circuit;
the at least one origin bus connector being electrically connected to the main voltage boosting circuit;
the at least one origin dock connector being electrically connected to the main voltage boosting circuit through the intermediate voltage boosting circuit;

the at least one origin bus connector being electrically connected to the internal power source through the battery charging circuit; and the at least one origin dock connector being electrically connected to the internal power source through the battery charging circuit.

20. The portable power transfer device as claimed in claim 17 comprises:

the plurality of input connectors being electrically connected to the power jack, the at least one terminal bus connector, and the at least one terminal dock connector through the voltage regulation circuit.

\* \* \* \* \*